Dec. 8, 1942.  D. S. FAULKNER  2,304,402
WEIGHT INDICATOR
Filed Aug. 1, 1941  3 Sheets-Sheet 1

Inventor
David S. Faulkner
By Lyon & Lyon
Attorneys

Dec. 8, 1942.  D. S. FAULKNER  2,304,402
WEIGHT INDICATOR
Filed Aug. 1, 1941  3 Sheets-Sheet 2

Inventor
David S. Faulkner
By Lyon & Lyon
Attorneys

Dec. 8, 1942.  D. S. FAULKNER  2,304,402
WEIGHT INDICATOR
Filed Aug. 1, 1941  3 Sheets-Sheet 3

Inventor
David S. Faulkner
By Lyon & Lyon
Attorneys

Patented Dec. 8, 1942

2,304,402

UNITED STATES PATENT OFFICE 2,304,402

WEIGHT INDICATOR

David S. Faulkner, Los Angeles, Calif., assignor to The National Supply Company, Pittsburgh, Pa., a corporation of Pennsylvania Application August 1, 1941, Serial No. 405,058

12 Claims. (Cl. 265—47)

This invention relates to well drilling apparatus, and more particularly to the type employed in the rotary process of drilling wells and to improvements in the rotary hook there utilized.

The principal object of this invention is to provide means for indicating the weight in suspension supported by the rotary hook.

Another object of this invention is to provide a rotary hook having incorporated therein hydraulic weight indicating means operative to indicate the weight suspended from the hook.

Another object of this invention is to provide a weight indicating hook incorporating hydraulic indicating means including an annular cylinder and piston which are concentrically disposed with relation to the body of the hook structure.

Another object of this invention is to provide a weight indicating hook including an annular pressure chamber wherein an annular piston is positioned between two depending walls of the supported member.

Another object of this invention is to provide a hydraulic indicator for rotary well drilling apparatus in which there is provided a signalling means for warning the operator in the event the hydraulic fluid should become depleted below a predetermined safe working quantity and which is operative to indicate depletion of the hydraulic fluid to such a point that a portion of the load would be supported in metal to metal contact, causing the weight indicator to give a false indication of the load supported.

Another object of this invention is to provide a rotary hydraulic weight indicating hook having a signal means and a vent means wherein the vent means is automatically closed when additional fluid is passed through the conduit connecting the gauge or indicating device and the hydraulic fluid containing chamber of the hook.

Another object of this invention is to provide a rotary hydraulic weight indicating hook having an annular hydraulic chamber in which the parts are arranged for easy replacement of the packing for the chamber without requiring disassembly of the shank of the hook from the supporting body.

Other objects and advantages of this invention it is believed will be apparent from the following detailed description of a preferred embodiment thereof as illustrated in the accompanying drawings.

In the drawings:

Figure 5 is a plan view partly broken away taken substantially on the line 5—5 of Figure 2 and illustrating the connecting means provided between the locking ring and the nut on the hook shank.

Figure 6 is a view similar to Figure 5 illustrating the lock ring as rotated to a position for disconnection from the nut.

Figure 7 is a partial plan view illustrating the locking connection provided at the upper end of the shank.

Figure 8 is a plan view partly in section of the separable spacer ring.

Figure 1:
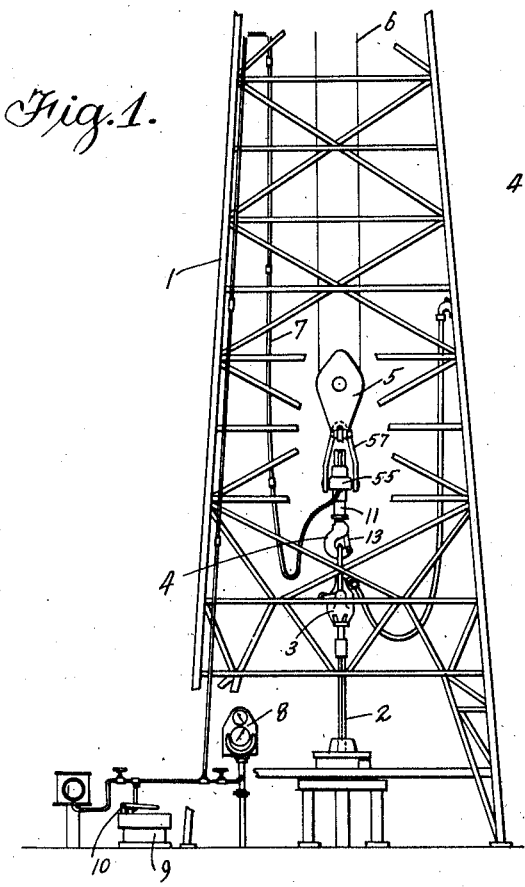
Figure 1 is a diagrammatic partial elevation of the rotary well drilling rig incorporating the weight indicating hook embodying my invention.
Figure 2:
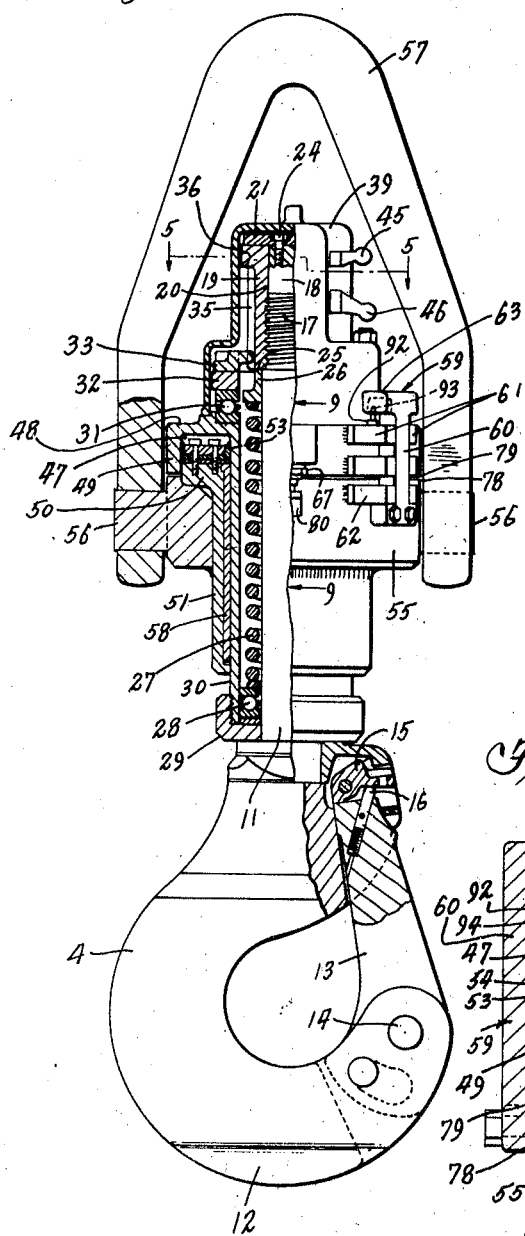
Figure 2 is an enlarged elevation partly in section of the weight indicating hook embodying my invention.
Figure 3:
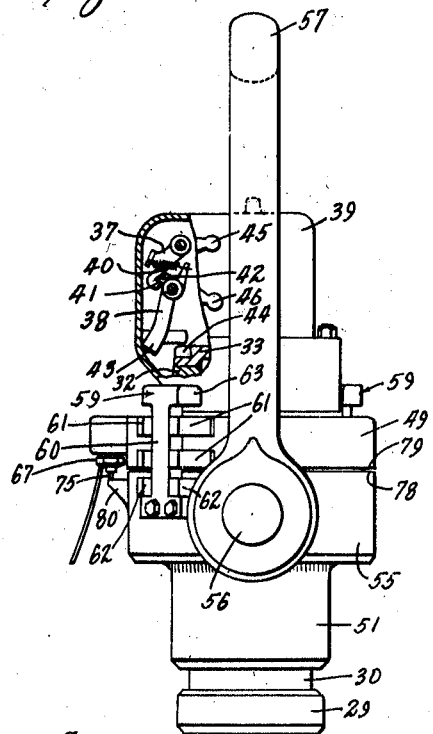
Figure 3 is an elevation at a position taken 90° from Figure 1, also partly in section.

In the preferred embodiment of my invention as illustrated in the accompanying drawings, I indicates a well derrick in which the rotary drill string 2 carried by a swivel 3 is supported by means of a hook 4 from a traveling block 5 suspended upon the line 6. The hook 4 is provided with a hydraulic weight indicating device and the hydraulic fluid is connected through a conduit 7 with an indicating gauge 8. A source of hydraulic fluid 9 is connected through a hand pump 10 with the conduit 7.

The rotary hook 4 has a shank 11 provided at its lower end with a load-supporting member 12 herein illustrated as of hook formation. As indicated, the hook is closed by a latch member 13 pivoted to the hook by a latch pin 14 and locked in closed position by means of a pivoted trigger 15 urged toward locking position by means of a spring-loaded plunger 16. The foregoing arrangement is such that the latch member 13 is automatically locked in place upon being moved to its closed position. The word "hook" is used herein in its generic sense to designate any of the common devices used between the traveling block and the swivel or elevators in a rotary drilling rig, and the "hook" may take the form shown in the Long Patent No. 2,158,373, issued May 16, 1939.

At its upper end the shank 11 is provided with a threaded portion 17 and a tapered portion 18. A nut 19 is threaded to the shank at the threaded portion 17 and is provided with a tapered bore 20 corresponding to the tapered surface 18. When the nut 19 is threaded to the shank 11, the tapered surfaces 18 and 20 are jammed tightly together and a locking bar 21 is then inserted in the matching recesses 22 and 23 cut in the upper ends of the nut and shank respectively to prevent unscrewing the nut 19. Cap screws 24 are provided for maintaining the locking bar 21 in position. At its lower end, the nut 19 provides a shoulder 25.

A collar 26 is mounted upon the shank 11 to engage the shoulder 25 and the collar 26 is urged against the shoulder 25 by means of a spring 27 mounted upon the shank 11. The spring 27 is supported at its lower end by means of a ball bearing 28, and this spring 27 functions in the manner common in this art (see Wilson B. Wigle Reissue Patent No. 14,253) to enable the hook 12 to raise the top section of drill pipe or kelly 2 upon disconnection from the remainder of the drill string. Such raising movement insures proper disengagement of the usual threaded connection. The ball bearing 28 is supported by means of a closure cap 29. The closure cap 29 is threaded to the housing 30 which encircles the spring 27. A ball bearing 31 is carried by the housing 30 near its upper end and a split spacer ring 32 is carried by the bearing 31. A lock ring 33 is mounted upon the spacer ring 32. The lock ring 33 is provided with a plurality of inwardly extending keys 34 which extend into corresponding axially extending keyways 35 formed in the nut 19 permitting the shank 11 to reciprocate axially relative to the housing 30 and the lock ring 33 but requires the lock ring 33 to rotate with the nut 19 and shank 11. The nut 19 is provided with a shoulder 36 which is adapted to engage the lock ring 33 to limit the downward movement of the shank 11.

There is provided a rotation lock device for selectively preventing rotation of the shank and for locking it in any one of a plurality of angular positions which may be of the type described in the Long Patent No. 2,158,372, issued May 16, 1939, for Spring hook. This lock device includes a pair of pivoted elements 37 and 38 mounted within the cap 39.

A spring 40 operatively connects the lock elements 37 and 38 and resiliently maintains their engaging surfaces 41 and 42 in contact. The lock element 38 is provided with a downwardly extending finger 43 adapted to engage any one of a number of recesses 44 formed in the lock ring 33. Each of the lock elements 37 and 38 is provided with an actuating lever 45 and 46 operable exterior of the cap 39. Actuation of the lever 45 releases the engaging surfaces 41 and 42 and permits the spring 40 to move the finger 43 to one of the recesses 44. Actuation of the lever 46 swings the finger 43 out of the recesses and brings the surfaces 41 and 42 back into engagement.

The upper end of the housing 30 is shaped to form a hydraulic cylinder 47 of annular shape, the upper portion of which is closed by a radially extending flange wall 48 which terminates in a downwardly extending outer wall 49. The structure just described is preferably of one-piece construction to avoid leakage.

Within the annular cylinder 47 thus formed is mounted a stationary annular piston 50 which is, as illustrated, formed integrally with the upper end of a sleeve member 51. Secured to the upper face of the piston 50 is a flat packing ring 52 and an annular U-shaped packing ring 53 held in position by means of a follower ring 54.

The piston 50 is supported by the crosshead 55 which is provided with the laterally extending trunnions 56. A supporting bail 57 is mounted upon the trunnions 56. The rotary hook is suspended from the traveling block by the medium of the bail 57.

The sleeve 51 extends downwardly through the crosshead 55 and encircles a portion of the housing 30. A bushing 58 is pressed into the bore of the sleeve 51 and acts as a guide to maintain the piston 50 and cylinder 47 in coaxial relationship. The sleeve 51 and crosshead 55 may be welded together to form in effect a single unit. Means are provided for preventing relative rotation of the housing 30 with relation to the crosshead 55 and for limiting axial movement of the housing 30 with relation to the piston 50. As herein illustrated, this means includes a double-ended T-bar 59 suitably secured to the crosshead 55, the shank 60 of which is positioned between lugs 61 and 62 carried by the annular wall 49 of the cylinder 47 and the outer crosshead 55 respectively. The upper cross bar 63 of the T-bar 59 extends over the cylinder 47 and acts to limit the upward movement of the cylinder 47 relative to crosshead 55. It is intended that two such T-bars 59 be employed at diametrically opposed points on the hook.

When it is desired to replace the packing rings 52 and 53, the cap 39 is removed and the split ring 32 is then accessible.

The split ring as illustrated in Figure 8 is connected through the medium of a bolt 64 holding the two halves of the ring which are pivotally connected by a pivot 65 together. The bolt 64 may then be removed and the two halves of the ring are then rotated apart permitting the split ring 32 to be withdrawn and the lock ring 33 to fall downward below the nut 19, disengaging the keys 34 from the keyways 35. As is illustrated in Figure 6, the keys 34 are signal keys, so that when the lock ring 33 is rotated from the position indicated in Figure 5 to the position indicated in Figure 6, the nut 19 may be dropped through the ring 33. The closure cap 29 at the lower end of the housing 30 is then unthreaded to permit the shank 11 and spring 27 and nut 19 to be withdrawn as a unit downwardly through the bore of the housing 30.

After the shank 11 has been removed, the T-bars 59 are withdrawn from position permitting the housing 30 to be raised from the crosshead 55 and piston 50 to make the packing 52 and 53 accessible for replacement. In this regard it should be noted that it is not necessary to unscrew the nut 19 from the shank 11 in order to replace the packing. Owing to the tremendous force exerted by the spring 27, such an operation would be difficult to perform, particularly in the oil fields where shop facilities are not available.

In the construction illustrated, the lock ring 33 is of integral construction but it is obvious that the same might be constructed like the split ring 32, in which case the split ring 32 would become unnecessary as the nut 19 would not be required to pass through the lock ring 33.

Figure 9:
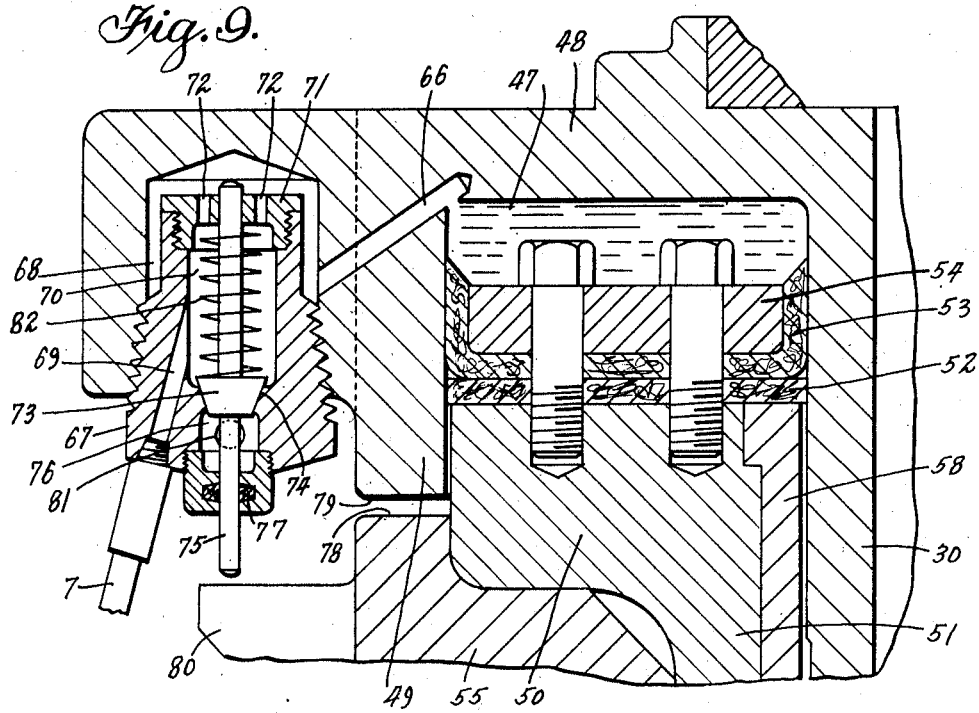
Figure 9 is a fragmental sectional elevation on an enlarged scale of the vent valve.

Hydraulic fluid is introduced into the annular cylinder 47 through the port 66 (Figure 9). A pressure fitting 67 is threaded into a bore 68 formed on the wall 49 in communication with the port 66 and with the flexible line 7. The flexible line 7 is connected with the pressure gauge 8 at the driller's position on the derrick floor as well as to the pump 10 and storage tank 9.

The pressure fitting 67 is provided with a port 69 connecting the line 7 with a chamber 70 formed within the fitting 67. The upper end of this chamber is defined by a closure flange 71 provided with apertures 72. Fluid pressure in the annular cylinder 47 is therefore communicated to the conduit 7 by way of the port 66, apertures 72, chamber 70 and port 69. The lower end of the chamber 70 is normally closed by a valve 73 engaging a seat 74. A valve rod 75 extends downwardly through the recess 76 and packing gland 77.

In the event the quantity of fluid in the chamber 47 becomes so low that the annular shoulders 78 and 79 are about to meet a metal to metal relation, the rod 75 engages a projecting finger 80 on the crosshead 55, moving the valve 73 away from its seat 74, permitting fluid under pressure to pass from the chamber 70 to the atmosphere through a lateral port 81.

When the shoulders 78 and 79 contact, no further oil is forced out through the lateral port 81, and the check valve 95 closes to prevent entrance of air into the system. The venting of the fluid causes the pressure gauge 8 to suddenly register zero, warning the driller that the quantity of fluid in the annular chamber or cylinder 47 has fallen below a safe value. If the shoulders 78 and 79 take a portion of the load carried by the hook directly in metal to metal relationship without the driller's knowledge, the gauge reading would be in error and might lead to serious consequences.

Figures 10, 11:
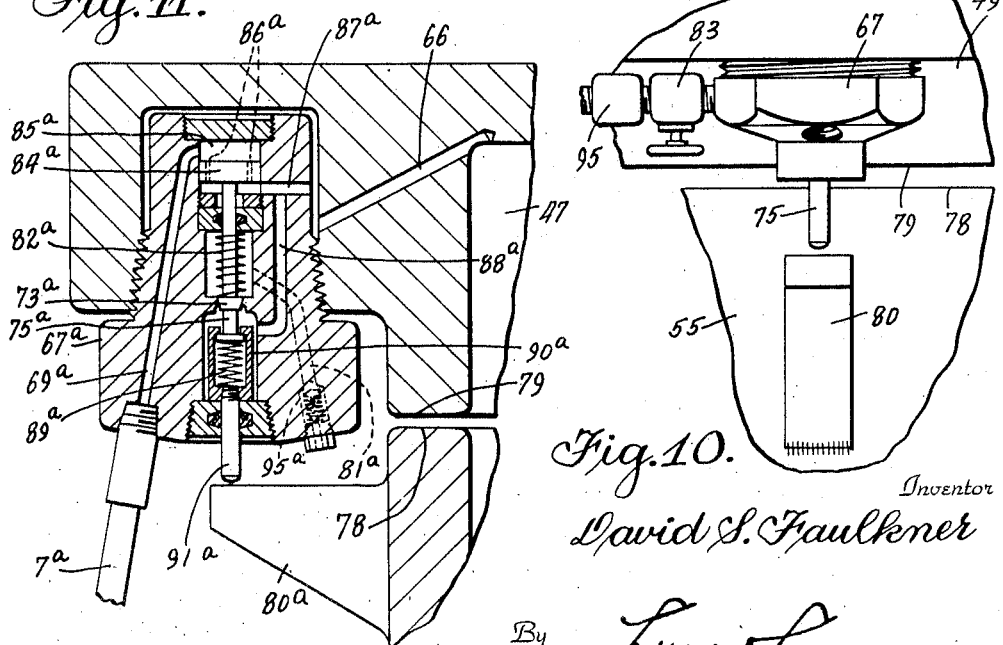
Figure 10 is a side elevation of the vent valve illustrated in Figure 9.
Figure 11 is a fragmental sectional view illustrating the incorporation of a modified form of vent valve.

In order to replenish the supply of fluid in the hydraulic chamber, it is first necessary to close the vent port 81 and, as illustrated in Figure 10, a manually operated valve 83 is provided for this purpose. When the port 81 is closed, fluid is pumped up through the conduit 7 from the storage chamber 9 by the pump 10.

When sufficient fluid has been pumped into the chamber 47 to raise the housing 30 relative to the crosshead 55 and hence separate the valve rod 75 and finger 80, the spring 82 automatically closes the valve 73. The manually operated valve 83 may then be reopened without loss of pressure from the conduit 7 or the hydraulic cylinder or chamber 47.

The modified form of vent valve illustrated in Figure 11 is similar in many respects to that illustrated in Figures 9 and 10 so that similar numerals have been used to indicate the same parts with the addition of an exponent $a$ thereto.

The modified form of vent valve illustrated in Figure 11 differs from that illustrated in Figures 9 and 10 in the provision of means for automatically closing the vent when additional fluid is pumped up to the chamber or cylinder 47. The provision of the means for automatically closing the vent eliminates the necessity for the man going up in the derrick in order to operate the manual valve 83.

In this modification the pressure fitting 67a has a piston 84a slidably mounted within the bore 85a. The piston 84a is connected to the valve 73a through the medium of the valve rod 75a. A pair of relatively small ports or apertures 86a are formed through the piston 84a. Fluid pressure in the annular cylinder 47 is therefore communicated to the conduit 7a by way of the port 66, port 87a, bore 85a, apertures 86a and port 69a.

In this modification when the finger 80a causes actuation of the valve operated rod 75a, the valve 73a is moved to open position, thereby venting the annular cylinder 47 to the atmosphere through the ports 88a and 81a and check valve 95a.

Interposed within the valve rod 75a in this modification is a lost motion connection comprising a spring 89a operating within a cylinder connector 90a. The spring 89a is strong enough to open the valve 73a against the fluid pressure and the relatively weak valve spring 82a.

As in the previous modification, venting of the chamber 47 causes the driller's gauge 8 to read zero, thereby apprizing the driller that additional fluid is needed in the said chamber. In this modification when additional fluid is pumped up through the conduit 7a to replenish this supply, the flow is so rapid that the small apertures 86a are unable to handle it and accordingly pressure builds up above the piston 84a, thereby forcing the valve 73a to closed position. Downward movement of the valve 73a is made possible by the lost motion connection 90a and spring 89a. When sufficient fluid has been added to the hydraulic annular cylinder 47 to separate the shoulders 78 and 79 by a substantial distance, the rod 91a and finger 80a separate and thereby relieve the valve of the upward force of the spring 89a. After the rod 91a and finger 80a have separated, the rate of flow through the conduit may be reduced without risk of the valve 73a reopening.

Figure 4:
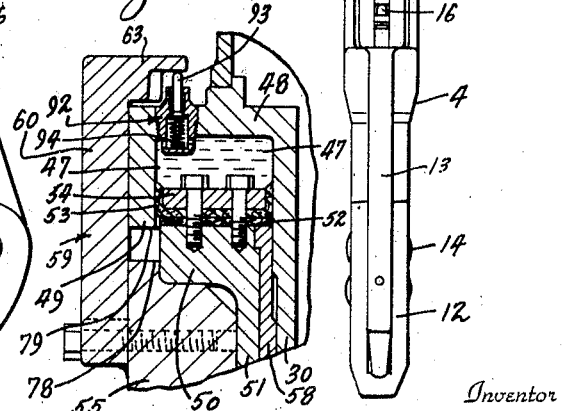
Figure 4 is a sectional detail view illustrating a relief valve.

In order to avoid the possibility of pumping too much hydraulic fluid into the annular cylinder 47 with the result that the housing 30 may be raised so high as to overstress the T-bars 59 or other parts of the device, a relief valve 92 (Figure 4) may be installed in the flange 48 arranged to operate when the flange approaches the under side of the head 63 of one of the T-bars 59. When the plunger 93 of the relief valve 92 is depressed by the head 63, hydraulic fluid under pressure within the cylinder 47 is allowed to escape outwardly through the valve. As the fluid escapes through the valve 92, the housing 30 moves downward relative to the crosshead 55, thereby moving the plunger 92 to close under the influence of the spring 94.

It will be apparent from the foregoing that the normal operation of the hook is in no way affected by the provision of the hydraulic cylinder. The entire hook need be no longer than an ordinary hook and is only slightly wider across the trunnions. It will also be apparent that although the load-carrying shank 11 may be allowed to revolve freely when desired, there is no rotation between the hydraulic cylinder 47 and the piston 50 which would tend to wear the hydraulic packing 52 and 53. It will also be apparent that water and other foreign matter will not tend to seep in behind the piston but rather to fall away from it, thereby extending the life of the packing.

Having fully described my invention, it is to be understood that I do not wish to be limited to the details herein set forth, but my invention is of the full scope of the appended claims.

I claim:

1. In a device of the class described, the combination of a crosshead having a central opening, suspension means for supporting the crosshead, a load carrying shank extending through said opening, a housing member encircling a portion of said shank, cooperating means forming an annular pressure chamber positioned coaxially of said shank and adapted to confine a fluid under pressure, a compression spring carried by the housing member adapted to support the shank for longitudinal movement relative to the housing member, a bearing at one end of the spring whereby the shank may rotate relative to the housing member, said annular pressure chamber being operatively interposed between the crosshead and the housing member and encircling a portion of the spring whereby the unit pressure of said fluid may provide a measure of the load carried by the shank.

2. In a device of the class described, the combination of a crosshead having a central opening, suspension means for supporting the crosshead, a load carrying assembly comprising a body and a shank, the body encircling the shank and having supporting means associated therewith adapted to support the shank for both longitudinal and rotary movement relative to the body, cooperating means forming an annular pressure chamber positioned coaxially of said shank and adapted to confine a fluid under pressure, said annular pressure chamber being operatively interposed between the crosshead and the load carrying assembly whereby the unit pressure of the fluid may provide a measure of the load carried by the shank, and means to prevent relative rotation between the crosshead and the body.

3. In a device of the class described, the combination of a crosshead having a central opening, suspension means for supporting the crosshead, a load carrying shank extending through said opening, an annular cylinder positioned coaxially of said shank comprising an annular radial flange having inner and outer walls depending axially therefrom, an annular piston in said cylinder between said depending walls and adapted to be supported by said crosshead, means including a compression spring adapted to support the shank upon said annular cylinder, a bearing at one end of the spring whereby the shank may rotate relative to the annular cylinder, the said cylinder and piston cooperating to confine a fluid under pressure, whereby the unit pressure of the fluid may vary in accordance with the load carried by the shank.

4. In a device of the class described, the combination of a shank having a load supporting element at its lower end, an abutment associated with the shank, a housing member encircling a portion of said shank and provided with a shoulder, an antifriction bearing on said shoulder, a spring operatively interposed between the abutment and the bearing and adapted to resiliently support the shank rotatively upon the housing member, an annular cylinder associated with the housing member comprising an annular radial flange having inner and outer walls depending axially therefrom, an annular piston in said cylinder between said depending walls, a support pendently suspended and adapted to carry said annular piston, said piston and cylinder cooperating to confine a fluid under pressure, whereby the unit pressure of said fluid may provide a measure of the load carried by the shank.

5. In a device of the class described, the combination of a shank having a load supporting element at its lower end, a nut threaded on the other end of the shank and provided with an abutment, a housing member encircling a portion of said shank and provided with an abutment, a spring operatively interposed between the abutments and adapted to resiliently support the shank upon the housing member, a thrust bearing positioned at one end of the spring between the spring and one of said abutments whereby the shank may rotate relative to the housing member, a support pendently suspended and having an annular piston associated therewith, an annular cylinder for said piston associated with said housing, said piston and cylinder cooperating to confine a fluid under pressure, whereby the unit pressure of said fluid may vary in accordance with the load carried by the shank, and means to prevent relative rotation between the piston and cylinder.

6. In a device of the class described, the combination of a body member having a central vertical bore, a supporting member, means forming an annular hydraulic chamber between said members adapted to confine a fluid body under pressure, an element detachably secured to said body member providing an annular supporting shoulder at the lower end of said bore, a load carrying shank extending through said bore, means including a coil spring adapted to support the shank on said annular shoulder and permit relative longitudinal movement therebetween, cooperating means adapted to limit the extent of such relative longitudinal movement, said cooperating means including an abutment associated with the shank and a ring member operatively supported on the body member, means for rendering the ring member ineffective in limiting downward movement of said abutment and shank, whereby the abutment, shank and spring may be withdrawn downwardly through said bore as a unit, upon detaching said element.

7. In a device of the class described, the combination of a load carrying shank, a nut secured to the upper end of the shank and provided with an abutment, a body member encircling a portion of the shank, an element detachably secured to the body member providing an annular supporting shoulder, means supporting the shank on the body member including a coil spring encircling the shank and operatively interposed between said annular shoulder and said nut, a ring member operatively supported on said body member and normally adapted to cooperate with said abutment to limit downward movement of the shank under load, means for rendering the ring member ineffective to limit downward movement of the shank, whereby the shank, nut and spring may be withdrawn downwardly through said body member as a unit, upon detaching said element.

8. In a device of the class described, the combination of a supported member, a supporting member, means forming a hydraulic chamber between said members adapted to confine a fluid body under pressure, means for indicating the unit pressure of said fluid body including a gage positioned remote from said hydraulic chamber and connected thereto by means of a conduit, valve means carried on one of said members and adapted to vent said conduit to atmosphere, and actuating means associated with the other of said members adapted to actuate the valve means upon depletion of fluid in said hydraulic chamber below a predetermined quantity.

9. A weight indicator for a rotary drilling rig, having in combination a first member pendently suspended, a second member supported thereby, means forming a hydraulic chamber between said members adapted to confine a fluid body under pressure, said means including a piston provided on one of said members cooperating with a cylinder provided on the other of said members, means for indicating the unit pressure of said fluid body including a gage positioned remote from said hydraulic chamber and connected thereto by means of a conduit, valve means associated with said cylinder and adapted to vent both the chamber and conduit to atmosphere, and actuating means associated with the piston adapted to actuate the valve means upon depletion of fluid in said hydraulic chamber below a predetermined quantity.

10. In a device of the class described, the combination of a supported member, a supporting member, means forming a hydraulic chamber between said members adapted to confine a fluid body under pressure, means for indicating the unit pressure of said fluid body including a gage positioned remote from said hydraulic chamber and connected thereto by means of a conduit, valve means associated with one of said members and adapted to relieve the pressure in said conduit actuating means associated with the other of said members adapted to actuate the valve means upon depletion of fluid in said hydraulic chamber, pump means connectible to said conduit at a point remote from said hydraulic chamber and operable to pump fluid through said conduit into said chamber, and means actuated by flow of fluid through said conduit adapted to close said valve means, whereby the quantity of fluid in said hydraulic chamber may be replenished.

11. In a device of the class described, the combination of a supporting member, a supported member having a central opening, means forming an annular hydraulic chamber between said members, an element detachably secured to said supported member, a load carrying shank extending through said opening, means including a coil spring adapted to support the shank on the detachable element and permit relative longitudinal movement therebetween, cooperating means adapted to limit the extent of such relative longitudinal movement including abutments associated with the shank and the body member, means for rendering said cooperating means ineffective for limiting downward movement of the shank, whereby the shank and spring may be withdrawn downwardly through said opening as a unit, upon detaching said element.

12. In a device of the class described, the combination of a supporting member, a supported member having a central opening, means forming an annular hydraulic chamber between said members, an element detachably secured to said supported member, a load carrying shank extending through said opening, means including a coil spring adapted to support the shank on the detachable element and permit relative longitudinal movement therebetween, cooperating means adapted to limit the extent of such relative longitudinal movement, said cooperating means including an abutment associated with the shank and a split ring operatively mounted on the supported member, the split ring being capable of withdrawal from operative position in order to render said cooperating means ineffective for limiting downward movement of said abutment and shank, whereby the abutment, shank and spring may be withdrawn downwardly through said opening as a unit, upon detaching said element.

DAVID S. FAULKNER.